United States Patent [19]

Sumiya et al.

[11] Patent Number: 4,969,725

[45] Date of Patent: Nov. 13, 1990

[54] METHOD AND APPARATUS FOR FINISHING AN X-RAY MIRROR

[75] Inventors: Mitsuo Sumiya; Katsunobu Ueda, both of Yokohama, Japan

[73] Assignee: Kabushiki Kaisha Toshiba, Kawasaki, Japan

[21] Appl. No.: 353,499

[22] Filed: May 18, 1989

[30] Foreign Application Priority Data

May 27, 1988 [JP] Japan ................................ 63-128434

[51] Int. Cl.[5] ............................................ G02B 5/08

[52] U.S. Cl. ...................................... 350/600; 378/43; 378/84; 378/145; 350/320

[58] Field of Search .................. 350/600, 320; 378/43, 378/145, 84

[56] References Cited

U.S. PATENT DOCUMENTS

| | | | |
|---|---|---|---|
| 3,352,062 | 11/1967 | Conover | 43/42.06 |
| 4,063,088 | 12/1977 | Dailey | 378/43 |
| 4,538,291 | 8/1985 | Iwamatsu | 378/43 |
| 4,596,030 | 6/1986 | Herziger et al. | 378/43 |

FOREIGN PATENT DOCUMENTS

| | | | |
|---|---|---|---|
| 938025 | 9/1963 | United Kingdom | 24/553 |

OTHER PUBLICATIONS

Journal of the Japan Society of Precision Engineering, vol. 43, No. 5, May 1977, EEM (Elastic Emission Machining), Yuzo Mori et al.

Journal of the Japan Society of Precision Engineering, vol. 46, No. 6, Jun. 1980, "Elastic Emission Machining and the Finished Surface", Yuzo Mori.

*Primary Examiner*—Bruce Y. Arnold
*Assistant Examiner*—Tho van Tran
*Attorney, Agent, or Firm*—Oblon, Spivak, McClelland, Maier & Neustadt

[57] ABSTRACT

An apparatus and method for finishing an X-ray mirror, having a substantially cylindrical mirror body and a reflecting mirror surface on the inner surface of the mirror body, includes a support post supporting the mirror body, and a male member which is inserted into an unfinished mirror body. The male member includes a chamber therein, an outer circumferential surface shaped in correspondence with the reflecting mirror surface, and a number of fine holes open to the outer circumferential surface. The male member is supported by a support section so that the outer circumferential surface faces the reflecting mirror surface with a required gap. An abrasive solution containing free abrasive grains is ejected toward the reflecting mirror surface from the outer circumferential surface of the male member through the fine holes, thereby polishing the reflecting mirror surface.

11 Claims, 3 Drawing Sheets

METHOD AND APPARATUS FOR FINISHING AN X-RAY MIRROR

BACKGROUND OF THE INVENTION

1. Field of the Invention

This invention relates to a method of finishing an X-ray mirror for use in such as an X-ray microscope and an apparatus for manufacturing the same finished X-ray mirror.

2. Description of the Related Art

X-rays have the features that their wavelength are longer than those of visible light and their transmission power is larger than that of electron beams. Since the X-ray has an absorption wavelength band inherent to each element, it is possible to identify a specified element through the utilization of the aforementioned nature of the X-ray as well as a fluorescent X-ray. For this reason, the X-rays provide an important means capable of obtaining atomic level information relating to an object.

However, in the wavelength range of the X-ray, the refractive index of an object is very approximate to unity. Accordingly, it was very difficult to manufacture lenses and mirrors for X-rays, which have the same functions as that of a refractive lens and a direct incident type reflecting mirror used in the visible region.

A recently developed X-ray microscope uses an X-ray mirror utilizing such a nature in which the X-rays are totally reflected when they are incident on a reflecting mirror surface at a very large angle of incident, that is, at a very small angle made with the reflecting mirror surface. An X-ray mirror having a Wolter-type reflecting mirror surface is well known. This mirror is formed in a substantially cylindrical shape, and its inner surface constitutes a hyperboloid of revolution and a reflecting surface of an ellipsoidal surface of revolution continuous thereto. These reflecting surfaces have a common focal point F1. With this mirror, a focal point F2 is selected as the object point, and the X-rays passing the object point are reflected by these two reflecting surfaces to be focused on a focal point F3. The use of the two reflecting surfaces reduces the distortion of the image of the object point which departs from the optical axis.

When an X-ray mirror having the above structure is applied to an X-ray microscope, light shielding plates are provided at the opening portions at both ends of the X-ray mirror such that X-rays reflected by the two reflecting surfaces are imaged on a detector located on the focal point F3. The light shielding plates are adapted to shield that X-rays of an X-ray beam shade the rays directly directed to the detector without emerging from the object point which are directed toward the detector without being incident on the reflecting surfaces. The X-rays enter the mirror through an annular slit defined between the peripheral edge of one of the shielding plates and one of the opening edges of the mirror and leave the mirror through an annular slit defined between the peripheral edge of the other shielding plate and the other opening edge of the mirror. It is required that these slits be coaxially arranged with the center axis of the X-ray mirror at the tolerance of several micrometers to several tens of micrometers.

Generally, the resolving ability of an X-ray microscope is determined by the finishing accuracy of reflecting surfaces which form the surfaces of revolution. The finishing accuracy of a reflecting mirror is classed as a surface roughness close to the wavelengths of the X-ray and a form accuracy having a relatively large period. In order to visualize an ideal X-ray microscope, it is required that the accuracy of processing the surface roughness of the reflecting surfaces should be in the order of nm or less. When the form accuracy is 0.07 micrometer and the surface roughness is 6 nm, for example, it is found that the resolving ability of the X-ray microscope is 0.1 micrometer.

However, it was very difficult to process, at accuracy in the order of nm or higher accuracy hyperboloid of revolution and an ellipsoid of revolution which are aspherical, and the required accuracy could not be attained by the conventional technique.

SUMMARY OF THE INVENTION

The object of this invention is to provide a method and an apparatus for finishing an X-ray mirror in which a reflecting mirror surface is processed at high accuracy.

In order to achieve the object, a finishing method according to this invention comprises the steps of: inserting into an unfinished X-ray mirror a male member having an outer peripheral surface in correspondence to the reflecting mirror surface of the X-ray mirror and a number of fine holes open to the outer peripheral surface such that the outer peripheral surface faces the reflecting mirror surface at a predetermined spacing, and ejecting abrasive solution containing free abrasive grains from the outer surface to the reflecting mirror surface through the fine holes of the male member so as to collide the abrasive solution with the reflecting mirror surface, thereby polishing the reflecting mirror surface.

A finishing apparatus according to this invention comprises supporting means for supporting an unfinished X-ray mirror, a hollow male member having an outer peripheral surface shaped in correspondence to the reflecting mirror surface of the X-ray mirror and a number of fine holes open to the outer peripheral surface, holding means for holding the male member within the X-ray mirror so that the outer peripheral surface of the male member faces the reflecting mirror surface at a predetermined spacing, and abrasive solution supplying means for ejecting abrasive solution containing free abrasive grains from the outer peripheral surface of the male member to the reflecting mirror surface to enable the abrasive solution to collide therewith.

With the finishing method and apparatus as described above, the reflecting mirror surface can be polished at an accuracy in the order of nm or higher accuracy by permitting the abrasive solution containing free abrasive grains to eject from the vicinity of the reflecting mirror surface thereto and to collide therewith.

BRIEF DESCRIPTION OF THE DRAWINGS

FIGS. 2 and 3 show an apparatus for manufacturing X-ray mirror, according an embodiment of this invention, in which FIG. 2 is a sectional view of the overall apparatus, and FIG. 3 is an enlarged sectional view of part of a male member and part of an X-ray mirror.

DETAILED DESCRIPTION OF THE PREFERRED EMBODIMENTS

An embodiment of the invention will now be explained in detail with reference to the accompanying drawings.

Figure 1:
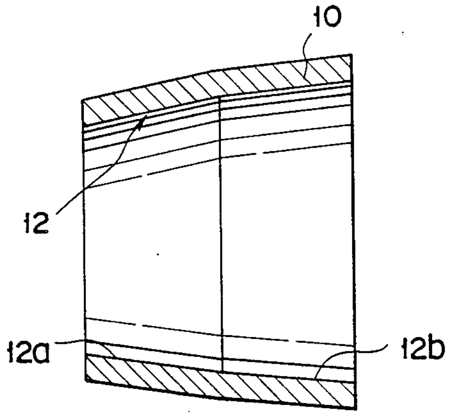
FIG. 1 is a longitudinal sectional view.

FIG. 1 shows an X-ray mirror which comprises a generally hollow cylindrical mirror body 10 made of copper, nickel or the like. The inner surface of the mirror body 10 constitutes a reflecting mirror surface 12 of tandem type. Specifically, the mirror surface 12 includes a first reflecting mirror surface **12*a* of a hyperboloid of revolution located at the one end side portion of the mirror body 10 and a second reflecting mirror surface 12*b* of an ellipsoid of revolution located at the other end side portion of the mirror body. The first and second reflecting mirror surfaces 12*a* and 12*b*** are continuous to, and arranged coaxially with each other.

Figure 2:
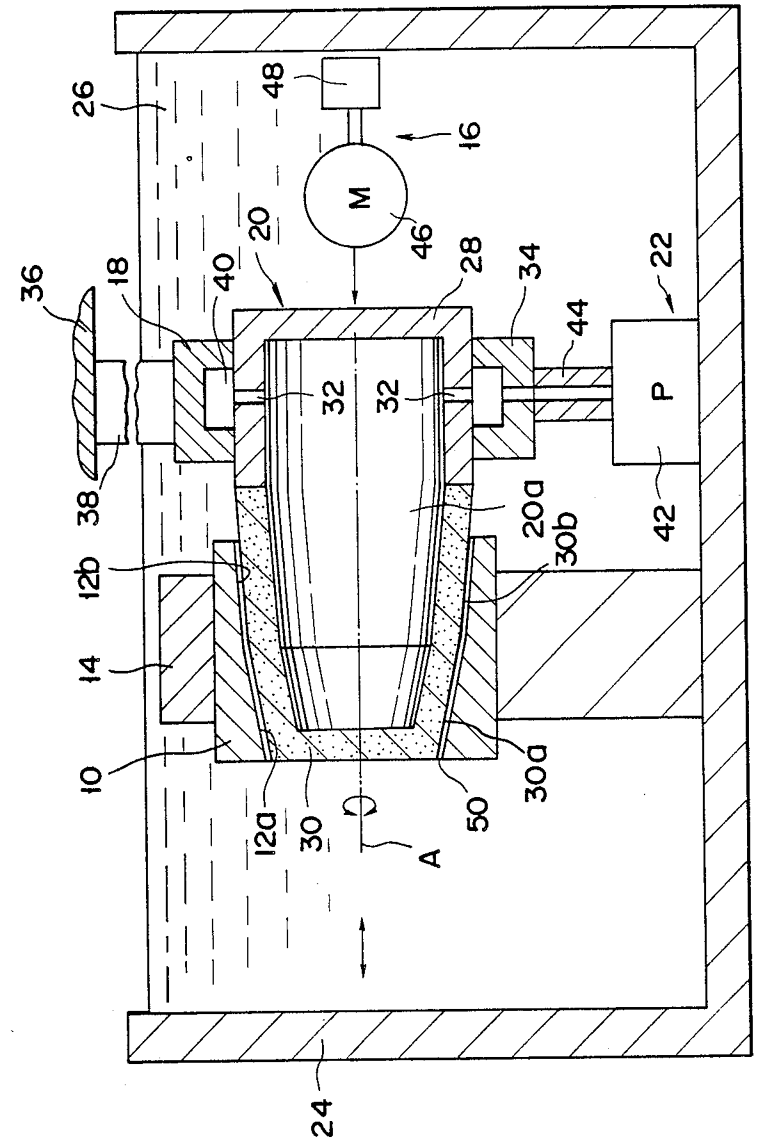

In FIG. 2 is shown in structure of an apparatus for finishing a reflecting mirror surface 12 of the X-ray mirror, which will be summarized as follows:

The finishing apparatus comprises holding post 14 for detachably holding the mirror body 10 of the X-ray mirror, a male member 20 inserted in the inner hole of the mirror body 10, a support portion 18 for supporting the male member 20 to be rotatable about the central axis A of the mirror body 10 and to be finally movable along the central axis A, a male member drive unit 16 for rotating and vibrating the male member 20, and an abrasive solution supply unit 22 for ejecting abrasive solution toward the reflecting mirror surface 12 of the mirror body 10 through the support portion 18 and male member 20. These constituent elements are arranged and immersed in an abrasive solution 26 in the tank 24. The abrasive solution 26 includes a solvent such as water, an alkaline solvent or an acidic solvent, and abrasive grains.

The holding post 14 is erected on the bottom of the tank 24 and holds the mirror body 10 with its central axis A held substantially horizontally. The reflecting mirror 12 of the mirror body 10 has previously been cut by a diamond tool to a precise surface roughness of the degree of several tens of angstroms.

The male member 20 comprises a hollow cylindrical base portion 28 with a closed end and a substantially hollow cylindrical male portion 30 with a closed end. These portions 28 and 30 are arranged coaxially and coupled with each other at their open ends, so that chamber **20*a* is defined within the male member 20. The outer circumferential surface of the male portion 30 consists of a hyperboloid of revolution 30*a* and an ellipsoid of revolution 30*b* corresponding to the shape of the reflecting mirror surface 12 of the mirror body 10 to be processed. These surfaces 30*a* and 30*b* are finished to a high accuracy of the order of nm and serve as datum surfaces for the reflecting mirror surface 12. The male portion 30 is made of porous material such as a sintered metal, sintered ceramics, and the like. In the peripheral wall of the base portion 28 are formed a plurality of through holes 32** disposed circumferentially at an equal spacing.

The support portion 18 comprises an annular bearing 34 and a fixing base 36 provided above the tank 24 such that its position can be adjusted. The bearing 34 is suspended from the fixing base 36 in the tank 24 by means of a support arm 38, and is fitted on the base portion 28 of the male member 20 in a liquid tight relation so as to form a so-called rotary coupling. In the inner wall of the bearing 34 is formed an annular groove 40 which communicates with the through holes 32 of the base portion 28. The male member 20 is supported by the support 18 such that its central axis is coaxial with the axis A of the mirror body 10, and such that the male member 20 is rotatable about its central axis and finely movable therealong. By adjusting the position of the bearing 34 by means of the fixing base 36, the male portion 30 of the male member 20 is inserted into the inner hole of the mirror body 10, which serves as a female member, such that the outer circumferential surface of the male member 20 faces the reflecting mirror surface 12 of the mirror body 10 with a gap 50 of approximately 10 to 30 micrometers therebetween.

The abrasive solution supply unit 22 includes a pump 42 mounted on the bottom of the tank 24 and a guide pipe 44 for connecting the discharge port of the pump 42 to the annular groove 40 of the bearing 34. The pump 42 sucks the abrasive solution 26 in the tank 24, compresses it and supplies it to the chamber **20*a* in the male member 20 via the guide pipe 44 and the annular groove 40**.

The drive unit 16 comprises a motor 46 connected to the base portion 28 of the male member 20, for rotating the male member 20 around its central axis A, and a vibrator 48 vibrating the motor 46 together with the male member 20 long the central axis A at an amplitude of approximately 10 to 100 micrometers.

There will now be explained how to process a reflecting mirror surface 12 by using the finishing apparatus as constructed above.

First, a mirror body 10 is cut by a diamond tool on a cutting machine (not shown) to form therein a reflecting mirror surface 12 having a surface roughness in the order of several tens of angstroms. Then, the mirror body 10 is supported by the holding post 14 with its central axis A being substantially horizontally. After the base portion 28 of the male member 20 is fitted in the bearing 34 of the support 18, the male member 20 is inserted into the inner hole of the mirror body 10. At this time, the position of the male member 20 is adjusted by the fixing base 36 so that a gap 50 of approximately 10 to 30 micrometers is evenly defined between the outer circumferential surface of the male member 20 and the reflecting mirror surface 12.

In this state, the motor 46 of the drive unit 16 is energized to rotate the male member 20 around the central axis A at a speed of approximately 300 rpm, and the vibrator 48 is also driven to vibrate the male member 20 along its central axis A by 10 to 100 micrometers at a frequency of 1000 Hz, whereby the abrasive solution 26 entering the gap 50 between the reflecting mirror surface 12 and the outer circumferential surfaces **30*a* and 30*b* of the male portion 30 flows on the reflecting mirror surface 12. As a result, the relative movement between the abrasive grains in the abrasive solution 26 and the reflecting mirror surface 12 allows the abrasive grains to polish the surface 12**.

Figure 3:
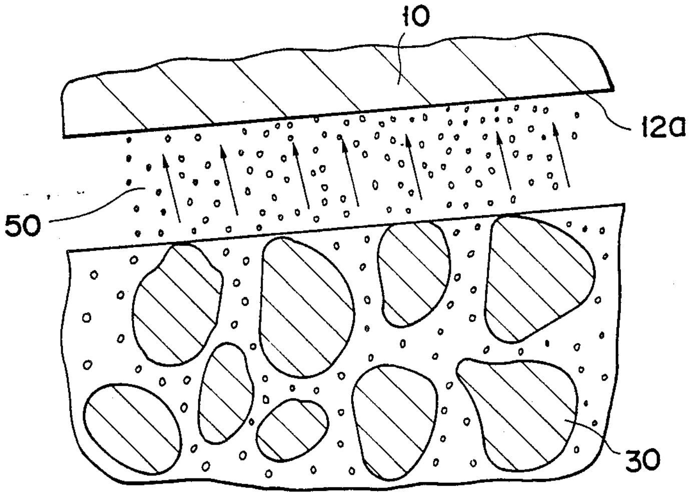

The pump 42 of the abrasive solution supply unit 22 is driven simultaneously together with the driving unit 16. The pump 42 sucks the abrasive solution 26 in the tank 24, and, after compression, supplies the solution 26 into the chamber **20*a* of the male member 20 through the guide pipe 44, the annular groove 40 and the through holes 32. The abrasive solution 26 supplied to the chamber 20*a* passes the fine holes in the male portion 30 made of porous material and is shot to the reflecting mirror surface 12. The abrasive grains contained in the ejected abrasive solution 26 collide with the reflecting mirror surface 12 as shown in FIG. 3**, and polish it.

As described above, by ejecting the abrasive solution 26 from the outer circumferential surfaces 30*a* and 30*b* of the male portion 30, while moving the male portion 30 relative to the reflecting, mirror surface 12 of the mirror body 10, that is, while rotating and vibrating the male portion 30 with respect to the reflecting mirror surface 12, the reflecting mirror surface 12 can be accurately polished in the order of nm or higher accuracy.

The above-mentioned polishing of the reflecting mirror surface 12 is mainly carried out by the following factors:

(1) fine elastic break-down of the reflecting mirror surface 12 resulting from the collision of the abrasive grains in the abrasive solution 26 with the reflecting mirror surface 12; and (2) relative movement between the abrasive grains in the abrasive solution 26 and the reflecting mirror surface 12, in the order of the arrangement of atoms, caused by the flow of the abrasive solution 26 in the gap 50.

This polishing mechanism allows the reflecting mirror surface 12 of the mirror body 10 to be polished at an accuracy of the order of nm or higher accuracy (a surface roughness of 2～3Å can be achieved), with the result that an X-ray mirror having an ideal surface roughness and an ideal form accuracy can be obtained.

This invention is not limited to the above-mentioned embodiment, but various modifications can be made within the scope of this invention.

For example, the reflecting mirror surface can be polished by only ejecting the abrasive solution without rotating and oscillating the male member. Further, either the rotation or the vibration of the male member can be omitted. Still further, the male member may be fixed, and the mirror body may be rotated and vibrated instead.

In the above embodiment, the reflecting mirror surface includes a hyperboloid of revolution and an ellipsoid of revolution. However, this invention can be applicable to finishing an X-ray mirror wherein the reflecting mirror surface includes at least one surface of revolution.

Figure 4:
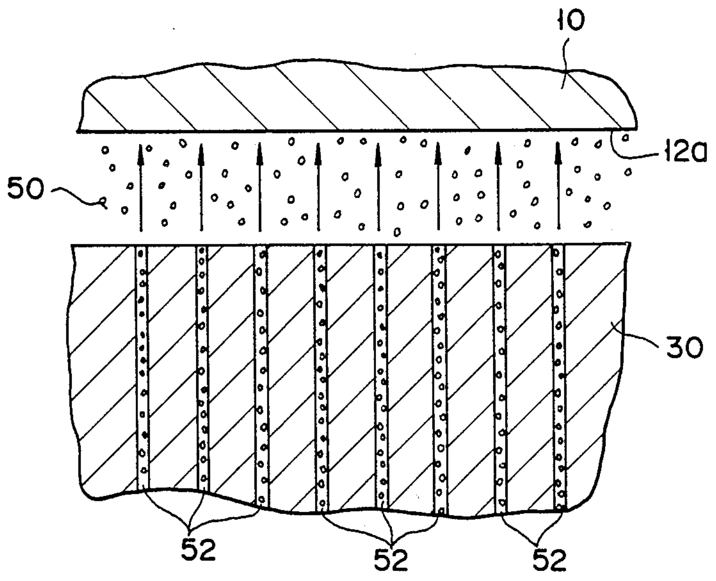
FIG. 4 is a sectional view showing part of a manufacturing apparatus according to a second embodiment of this invention.

Moreover, instead of forming the male portion 30 by porous material, it may be constructed as is shown in FIG. 4. In this embodiment, a male poriton 30 is formed of a metal in a substantially cylindrical shape with a closed end. A number of fine holes 52 are bored in the peripheral wall of the male portion 30, and both ends of each hole open to the outer circumferential surface of the male portion and an inner chamber 20*a*, respectively. Each hole 52 is formed by using a drill, laser beam, and the like, in a diameter of about 0.5 mm or less.

With this embodiment, the abrasive solution is ejected toward the reflecting mirror surface 12 from the holes 52.

What is claimed is:

1. A method of finishing an X-ray mirror having a substantially cylindrical shape and a reflecting mirror surface on its inner surface, the reflecting mirror surface including at least one surface of revolution, said method comprising the steps of:

inserting into an unfinished X-ray mirror a male member, which has an outer circumferential surface shaped in correspondence to the reflecting mirror surface to be finished and a number of fine holes open to the outer circumferential surface of the male member, such that the outer circumferential surface of the male member faces the reflecting mirror surface with a required gap; and ejecting abrasive solution containing free abrasive grains toward the reflecting mirror surface from the fine holes so as to allow the abrasive solution to collide therewith, thereby finishing the reflecting mirror surface.

2. A method according to claim 1, wherein said ejecting abrasive solution step includes relative movement between the reflecting mirror surface and the outer circumferential surface of the male member.

3. A method according to claim 2, wherein said the relative movement includes rotating the male member around a central axis of the outer circumferential surface of the male member.

4. A method according to claim 2, wherein said relative movement includes vibrating the male member along a central axis of the outer circumferential surface.

5. A method according to claim 1, wherein said ejecting abrasive solution step is carried out while the X-ray mirror and the male member are immersed in the abrasive solution.

6. An apparatus for finishing an X-ray mirror having a substantially cylindrical mirror body, and a reflecting mirror surface formed on the inner surface of the mirror body, comprising:

holding means for holding the mirror body;

a male member having a chamber defined therein, an outer circumferential surface shaped in correspondence to the reflecting mirror surface, and a number of fine holes open to the outer circumferential surface of the male member;

support means for supporting the male member in the mirror body with the outer circumferential surface of the male member facing the reflecting mirror surface with a required gap therebetween; and supply means for ejecting abrasive solution containing free abrasive grains from the outer circumferential surface of the male member toward the reflecting mirror surface through the chamber and the fine holes of said male member to allow the abrasive solution to collide with the reflecting mirror surface.

7. An apparatus according to claim 6, which further comprises a tank filled with the abrasive solution, wherein said mirror body and said male member are immersed in the abrasive solution in the tank, and wherein said required gap between the reflecting mirror surface and the outer circumferential surface of the male member is filled with the abrasive solution.

8. An apparatus according to claim 7, which further comprises drive means for making relative movement between the reflecting mirror surface and the outer circumferential surface of the male member

9. An apparatus according to claim 8, wherein said male member has a central axis coaxial with the outer circumferential surface and is arranged coaxially with the reflecting mirror surface, said support means has a bearing carrying the male member to be rotatable about the central axis, and said drive means has means for rotating the male member.

10. An apparatus according to claim 8, wherein said male member has a central axis coaxial with the outer circumferential surface and is arranged coaxially with the reflecting mirror surface, said support means has a bearing carrying the male member which is displaceable along the central axis, and said drive means has means for finely vibrating the male member along the central axis.

11. An apparatus according to claim 7, wherein said supply means has a pump for sucking the abrasive solution in the tank, compressing the sucked abrasive solution and then supplying it into the chamber of the male member.

* * * * *